United States Patent [19]
Bedal et al.

[11] Patent Number: 6,162,378
[45] Date of Patent: *Dec. 19, 2000

[54] METHOD AND APPARATUS FOR VARIABLY CONTROLLING THE TEMPERATURE IN A SELECTIVE DEPOSITION MODELING ENVIRONMENT

[75] Inventors: Bryan J. L. Bedal, Santa Clarita; Joe M. Brown, Valencia; John Stockwell, Sylmar; Andisheh Vahidkhah, Moorpark, all of Calif.

[73] Assignee: 3D Systems, Inc., Valencia, Calif.

[*] Notice: This patent issued on a continued prosecution application filed under 37 CFR 1.53(d), and is subject to the twenty year patent term provisions of 35 U.S.C. 154(a)(2).

[21] Appl. No.: 09/257,360

[22] Filed: Feb. 25, 1999

[51] Int. Cl.$^7$ .............................. B29C 41/02; B29C 41/52
[52] U.S. Cl. ..................... 264/40.1; 264/308; 425/143; 425/375; 700/119
[58] Field of Search .................................. 264/40.1, 308; 425/143, 375; 700/119

[56] References Cited

U.S. PATENT DOCUMENTS

| | | |
|---|---|---|
| 4,752,352 | 6/1988 | Feygin . |
| 4,863,538 | 9/1989 | Deckard . |
| 4,961,154 | 10/1990 | Pomerantz et al. . |
| 5,015,312 | 5/1991 | Kinzie . |
| 5,031,120 | 7/1991 | Pomerantz et al. . |
| 5,121,329 | 6/1992 | Crump . |
| 5,204,055 | 4/1993 | Sachs et al. . |
| 5,280,569 | 1/1994 | Tsujido . |
| 5,695,707 | 12/1997 | Almquist et al. . |
| 5,776,409 | 7/1998 | Almquist et al. . |
| 5,943,235 | 8/1999 | Earl et al. . |

FOREIGN PATENT DOCUMENTS

| | | |
|---|---|---|
| 63-307913 | 12/1988 | Japan . |
| 2-185427 | 7/1990 | Japan . |
| WO 95/05935 | 3/1995 | WIPO . |
| WO 95/18009 | 7/1995 | WIPO . |
| WO 95/12610 | 5/1996 | WIPO . |
| WO 96/12607 | 5/1996 | WIPO . |
| WO 96/12608 | 5/1996 | WIPO . |
| WO 96/12609 | 5/1996 | WIPO . |
| WO 97/11835 | 4/1997 | WIPO . |
| WO 97/11837 | 4/1997 | WIPO . |

*Primary Examiner*—Leo B. Tentoni
*Attorney, Agent, or Firm*—Ralph D'Alessandro; Ted R. Rittmaster

[57] ABSTRACT

A method, system and apparatus for variably controlling the temperature in a selective deposition modeling environment. The temperature of the formed portion of the three-dimensional object is detected. A gas is forced onto a surface of the formed portion of the three-dimensional object. The forced gas has a characteristic, such as temperature and quantity, that is variably controlled based on the detected temperature of the formed portion of the three-dimensional object.

38 Claims, 1 Drawing Sheet

METHOD AND APPARATUS FOR VARIABLY CONTROLLING THE TEMPERATURE IN A SELECTIVE DEPOSITION MODELING ENVIRONMENT

FIELD OF THE INVENTION

This invention relates to the formation of three-dimensional objects on substantially a layer-by-layer basis with enhanced resolution. Preferred embodiments of the invention more particularly relate to variably controlling the temperature of a three-dimensional object in a selective deposition modeling environment.

BACKGROUND OF THE INVENTION

1. Related Art

Rapid Prototypying and Manufacturing (RP&M) is the name given to a field of technologies that can be used to form three-dimensional objects rapidly and automatically from three-dimensional computer data representing the objects. RP&M can be considered to include three classes of technologies: (1) Stereolithography; (2) Laminated Object Manufacturing; and (3) Selective Deposition Modeling.

The stereolithography class of technologies create three-dimensional objects based on the successive formation of layers of a fluid-like medium adjacent to previously formed layers of medium and the selective solidification of those layers according to cross-sectional data representing successive slices of the three-dimensional object in order to form and adhere laminae. One specific stereolithography technology is known simply as stereolithography and uses a liquid medium which is selectively solidified by exposing it to prescribed stimulation. The liquid medium is typically a photopolymer and the prescribed stimulation is typically visible or ultraviolet electromagnetic radiation. Liquid-based stereolithography is disclosed in various patents, applications, and publications of which a number are briefly described in the Related Applications section hereinafter. Another stereolithography technology is known as Selective Laser Sintering (SLS). SLS is based on the selective solidification of layers of a powdered medium by exposing the layers to infrared electromagnetic radiation to sinter or fuse the particles. SLS is described in U.S. Pat. No. 4,863,538 issued Sep. 5, 1989 to Deckard. A third technology is known as Three-dimensional Printing (3DP). 3DP is based on the selective solidification of layers of a powdered medium which are solidified by the selective deposition of a binder thereon. 3DP is described in U.S. Pat. No. 5,204,055 issued Apr. 20, 1993 to Sachs. A third technique is called Multijet Modeling, MJM, and involves the selective deposition of droplets of material from multiple ink jet orifices to speed the building process. MJM is described in PCT Publication Nos. WO 97-11835 published Apr. 3, 1997 naming Leyden as an inventor and WO 97-11837 published Apr. 3, 1997 naming Earl as an inventor (both assigned to 3D Systems, Inc. as is the instant application). Another patent describing Selective Deposition Modeling is U.S. Pat. No. 5,943,235 entitled "Method and Apparatus for Data Manipulation and System Control in a Selective Deposition Modeling System" which is assigned to the assignee of the present invention and which is incorporated by reference herein in pertinent pat.

Laminated Object Manufacturing, LOM, techniques involve the formation of three-dimensional objects by the stacking, adhering, and selective cutting of sheets of material, in a selected order, according to the cross-sectional data representing the three-dimensional object to be formed. LOM is described in U.S. Pat. Nos. 4,752,352 issued Jun. 21, 1998 to Feygin; and 5,015,312 issued May 14, 1991 to Kinzie, and in PCT Publication No. WO 95-18009 published Jul. 6, 1995 naming Morita as an inventor.

Selective Deposition Modeling, SDM, involves the build-up of three-dimensional objects by selectively depositing solidifiable material on a lamina-by-lamina basis according to cross-sectional data representing slices of the three-dimensional object. One such technique is called Fused Deposition Modeling, FDM, and involves the extrusion of streams of heated, flowable material which solidify as they are dispensed onto the previously formed laminae of the object. An example FDM process is described in U.S. Pat. No. 5,121,329 issued Jun. 9, 1992 to Crump. Another technique is called Ballistic Particle Manufacturing, BPM, which uses a 5-axis, ink-jet dispenser to direct particles of a material onto previously solidified layers of the object. Example BPM processes are described in PCT publication numbers WO 96-12607 published May 2, 1996 listing Brown as an inventor; WO 96-12608 published May 2, 1996 listing Brown as an inventor; WO 96-12609 published May 2, 1996 listing Menhennett as an inventor; and WO 96-12610 published May 2, 1996 listing Menhennett as an inventor, all assigned to BPM Technology, Inc.

Preferred embodiments of the present invention are primarily directed to Selective Deposition Modeling methods, systems, and apparatuses. Specifically, embodiments of the present invention involve the temperature control for controlling the solidification of the solidifiable material and, preferably, reducing the time required to build a three-dimensional object. Various solidifiable materials (e.g., polymer waxes and thermopolymer waxes) may be used in Selective Deposition Modeling processes to form a three-dimensional object. The material will preferably melt at a temperature above its melting point temperature to allow selective deposition and rapidly solidify at a temperature below its freezing point temperature to form part of a three-dimensional build structure. The melting point and freezing point temperatures are inherent properties of the selected solidifiable material.

The temperature of the environment in which the material solidifies may be an ambient temperature or it may be artificially produced. The temperature must be low enough, relative to the melting point temperature of the material, to cause the material to solidify or freeze at a particular rate. However, if the temperature is too low, the solidified material may experience built in stresses or brittleness.

A technique used in Selective Deposition Modeling systems previously manufactured by 3D Systems Inc. (the Assignee of the present invention) for controlling the build temperature employed cooling fans mounted near the dispenser that dispenses the solidifiable material. The fans are operated at a constant rate through the building process to cool the solidifiable material by blowing air onto the solidifiable material during the formation of the three-dimensional object. Specifically, the fans generally cool each layer or lamina substantially instantaneously upon dispensation and continue to blow air on each layer or lamina after dispensation. Hence, some regions of the three-dimensional object can become colder than other regions. If the different regions are allowed to remain at different temperatures, the three-dimensional object may experience a differential amount of shrinkage as it is cooled. This differential in shrinkage could lead to the development of stresses within the object and associated distortions of the object.

Building an object on a layer-by-layer basis can take a considerable amount of time. The amount of time required to build an object is related to several factors, such as the type of solidifiable material used to build the object and the dispensing rate of the solidifiable material. The dispensing rate of the solidfiable material is related, at least in part, to the freezing point of the solidifiable material.

When dispensing layer after layer of solidifiable material, the dispenser may be required to wait between layers, to allow the most recently formed layer to sufficiently freeze before dispensing the next layer. For low freezing point temperatures, the dispenser may have to wait a long time until the previous drop freezes. For example, assume that one solidifiable material has a freezing point of 60° C. and another solidifiable material has a freezing point of 50° C. Assuming both materials have the same dispensing temperature (and other parameters, such as heat conductivity, drop volume, support temperature, etc. are the same), the material with the freezing point of 50° C. will take longer to solidify than the material with the freezing point of 60° C. Hence, the time it takes to build a three-dimensional object would be longer for the solidfiable material with a freezing point of 50° C. than for the solidifiable material with a freezing point of 60° C.

Other factors may also affect the time it takes for each drop to solidify or freeze (e.g., the insulating properties of the solidfiable material and/or the ambient temperature). The past techniques tended to pre-set the dispensing rate based either on the inherent properties of a solidifiable material or on experimental data. Such pre-setting is generally inefficient because it does not consider the build-time state (i.e., temperature) of the object. The pre-setting scenario typically produces a constant dispensing rate and creates an open loop system that lacks the benefit of feedback information (i.e., current temperature of the object). Without feedback, the dispensing rate may not be increased (or decreased) based on the current temperature of the object. Thus, the use of a constant dispensing rate can prolong the time it takes to build a three-dimensional object.

SUMMARY OF THE DISCLOSURE

It is an object of the present invention to provide simplified techniques (methods, systems, and apparatuses) for maintaining the temperature of a three-dimensional object within a predetermined range and for reducing the time required to build three-dimensional objects.

According to a first embodiment of the invention, a method, system and apparatus for forming a three-dimensional object involves, forming a portion of the three-dimensional object using selective deposition modeling. The temperature of the formed portion of the three-dimensional object is detected. A gas is forced onto a surface of the formed portion of the three-dimensional object. The forced gas has a characteristic, such as temperature and quantity, that is variably controlled based on the detected temperature of the formed portion of the three-dimensional object.

According to a second embodiment of the invention, a method, system, and apparatus for forming a three-dimensional object also involves forming a portion of the three-dimensional object using selective deposition modeling, wherein a gas is forced onto the surface of the formed portion of the three-dimensional object. However, the forced gas has a characteristic, such as temperature and quantity, that is variably controlled based on the geometry of the formed portion of the three-dimensional object.

According to a third embodiment of the invention, a method, system, and apparatus also involves forming a three-dimensional object using selective deposition modeling and forcing a gas onto the surface of the formed portion of the three-dimensional object. However, the quantity of the gas is variably controlled based on a pre-determined quantity of gas value and the temperature of the gas is variably controlled based on a pre-determined temperature of gas value.

According to a fourth embodiment of the invention, a method, system, and apparatus also involves forming a three-dimensional object using selective deposition modeling. The portion of three-dimensional object is formed in a build environment that has a temperature. The temperature of the build environment is detected. A gas is forced through the build environment, wherein the gas has a characteristic, such as temperature and quantity, that is related to the detected temperature of the build environment.

According to a fifth embodiment of the invention, a method, system, and apparatus also involves forming a three-dimensional object in a build environment using selective deposition modeling. The temperature of the formed three-dimensional object is detected. A gas is forced through the build environment. The gas has a characteristic, such as temperature and quantity, that is related to the detected temperature of the three-dimensional object.

According to a sixth embodiment of the invention, a method, system, and apparatus also involves forming a three-dimensional object using selective deposition modeling. However, the dispensing rate is modified using a minimum layer per second (MLS) technique, wherein the MLS technique incorporates a detected temperature of the build environment.

According to a seventh embodiment of the invention, a method, system, and apparatus also involves forming a three-dimensional object using selective deposition modeling. A quantity of gas is forced onto the surface of the formed portion of the three-dimensional object. A thickness and a vertical accumulation rate of the flowable material is selected. The thickness is based on the forced quantity of gas and the vertical accumulation rate is greater than 1.5 mils/15 seconds.

Other aspects of the invention supply apparatuses for implementing the method aspects of the invention noted above.

Additional aspects of the invention will be clear from the embodiments of the invention described below in conjunction with the Figures associated therewith. Further aspects of invention involve the practice of the above referred to aspects of the invention in combination with one another.

DESCRIPTION OF THE INVENTION

As previously discussed, the subject application is directed to control system techniques for controlling jobs in a Selective Deposition Modeling (SDM) system. The detailed description of a preferred embodiment of the invention will begin with a description of a preferred Selective Deposition Modeling system wherein embodiment details will be described as appropriate.

Figure 1:
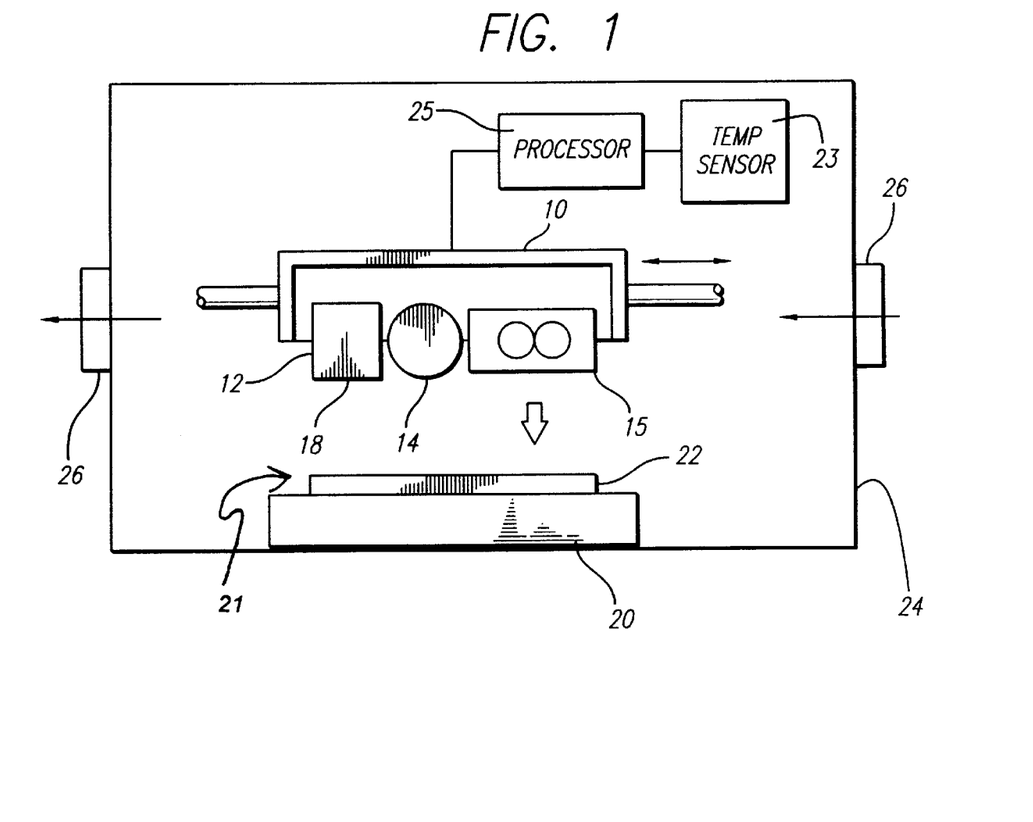
FIG. 1 illustrates a two-dimensional view of a preferred apparatus for performing Selective Deposition Modeling.

A preferred apparatus for performing Selective Deposition Modeling is illustrated in FIG. 1. The apparatus comprises a dispensing carriage 10 on which is situated dispensing head 12 (e.g. multi-orifice ink jet head) and planarizer (e.g., a rotating and/or heated roller) 14. The dispensing carriage 10 is supported and drivable back and forth in the X-direction, also known as the main scanning direction, adjacent a build platform 20. The spacing between the head 12 and the dispensing carriage 10 in FIG. 1 is exaggerated for simplifying the present disclosure. In practice the spacing would be small enough to allow the planarizer 14 to contact material deposited on the build platform by the head 12. The motion of the dispensing carriage 10 is under the control of a suitable drive motor and a control computer or microprocessor (not shown).

Furthermore, at either side of the dispensing carriage 10 and/or between the planarizer 14 and dispensing head 12, one or more fans 15 for blowing air vertically down are mounted to help cool the dispensed material and substrate such that the desired building temperature is maintained. Of course other mounting schemes for the fans and/or other cooling systems are possible including the use of misting devices for directing vaporizable liquids (e.g. water, alcohol, or solvents) onto the surface of the object. Cooling systems might involve active or passive techniques for removing heat and may be computer controlled in combination with temperature sensing devices to maintain the dispensed material within the desired building temperature range.

The dispensing head (also referred to as a print head or dispenser) 12 may be for example, a commercial print head configured for jetting color hot melt inks (e.g. thermal plastics or wax-like materials), and modified and/or controlled for use in a three-dimensional modeling system wherein the print head 12 undergoes back and forth movements and accelerations. In one example of a preferred embodiment, the head is a 352 jet multi-color commercial print head produced by Tektronix, Inc. One group of jets comprises four jets 16 which, in a color print head, would represent four colors. Three jets are on the same x-line, and one jet at the end of the sequence of four jets is positioned slightly off of this x-line (i.e., on a different y-dimension location from the other three jets).

The print head 12 is supplied hot melt material in a flowable state from a reservoir (not shown) for selective jetting from the print head. In a preferred implementation, all 352 jets on the print head 12 are computer controlled to selectively fire droplets when each orifice (i.e., jet) is appropriately located to dispense droplets onto desired locations of a build platform 20. In practice, commands are sent to each jet selectively commanding each one to fire (i.e., dispense a droplet) or not to fire (i.e., not to dispense a droplet) depending on jet position and desired locations for material deposition. Also, in practice, firing commands are preferably sent simultaneously to all jets. Thus, in a preferred embodiment, the head is computer controlled so as to selectively fire the jets, to simultaneously emit droplets of the molten material through one or more jets. Of course it will be appreciated that in alternative embodiments, heads with a different numbers of jets can be used, different firing frequencies are possible and, in appropriate circumstances, non-simultaneous firing of the jets is possible.

The print head 12 defines a pattern of orifices corresponding in number to the number of jets. With respect to FIG. 1, the orifices are directed such that droplets of material are allowed to emit from the underside of the dispensing carriage 10. In a preferred embodiment, the dispensing head 12 (i.e., the array of orifices) is mounted at an angle to the main scanning direction (e.g. X-direction) and is configured with the N=352 individually controllable orifices, arranged in 88 groups of four jets.

Each dispenser (e.g., jet) is equipped with a piezoelectric element which causes a pressure wave to propagate through the material when an electric firing pulse is applied to the element in accordance with well known ink jet head technology. The pressure wave causes a drop of material to be emitted from orifice. The 352 dispensers are controlled by the control computer (not shown) which controls the rate and timing of the firing pulses applied to the individual dispenser and therefore the rate and timing of droplets being emitted from the orifices.

One preferred embodiment uses raster scanning to position the print head and orifices to dispense material at desired drop locations. The printing process for each layer is accomplished by a series of relative movements between the head and the desired drop locations on the build platform or previously formed layer. Printing typically occurs as the head relatively moves in a main scanning direction. This is followed by a movement of the build platform 20 in a secondary scanning direction (i.e., y-direction), while the dispensing carriage 10 is moving in a reverse scanning direction (i.e., opposite x-direction from the direction of movement while dispensing) while no dispensing occurs. This is followed by another scan in the main scanning direction in which dispensing again occurs. Alternatively, dispensing may occur in both the forward and reverse x-direction. This process occurs repeatedly until the layer is completely deposited. The procedure is then repeated for each subsequent layer.

Other alternative embodiments may utilize vector scanning techniques or a combination of vector scanning and raster scanning. Other alternative embodiments may use substantially non-perpendicular main and secondary scanning directions along with techniques that result in proper placement of droplets.

In other alternative embodiments multiple prints heads may be used which lay end to end (extend in the secondary scanning direction) and/or which are stacked back to back (stacked in the main scanning direction). When stacked back to back the print heads may have orifices aligned in the main scanning direction so that they print over the same lines or alternatively they may be offset from one another so as dispense material along different main scanning lines. In particular, it may be desirable to have the back to back print heads offset from each other in the secondary scanning direction by the desired raster line spacing to minimize the number of main scanning passes that must occur. In other alternative embodiments the data defining deposition locations may not be located by pixels defining a rectangular grid but instead may be located by pixels laid out in some other pattern (e.g. offset or staggered pattern). More particularly, the deposition locations may be fully or partially varied from layer to layer in order to perform partial pixel drop location offsetting for an entire layer or for a portion of a layer based on the particulars of a region to be jetted.

With reference to FIG. 1, planarizer 14 comprises a heated rotating cylinder with a smooth surface. Its function is to melt, transfer and remove portions of the most recently dispensed layer of material, to smooth it out, to set a desired thickness for the last formed layer, and to set the net upper surface of the last formed layer to a desired level (i.e. the desired working surface or working level for forming a next lamina of the object). Numeral 22 identifies a layer of material which has just been deposited by the print head. The rotating cylinder planarizer 14 is mounted to the dispensing carriage 10 such that it is allowed to project from the underside of the platform by a sufficient amount in the Z-direction such that it contacts material 22 on build platform 20 at a desired level below the orifice plate (the spacing between the planarizer 14 and material 22 is exaggerated in FIG. 1, to more clearly show elements of the system).

The rotation of the planarizer cylinder sweeps material from the just-deposited layer, leaving a smooth surface. The just-deposited material adheres to the heated surface of the cylinder and is displaced until it contacts a wiper (not shown). The wiper is disposed to effectively "scrape" the material from the surface of the cylinder. This material, which is still flowable, is either disposed of or recycled.

With reference to FIG. 1, build platform 20 defines a surface on which is built the three-dimensional object or part, indicated generally by the numeral 21 layer-by-layer. This platform 20 is preferably supported for movement and driven back and forth in the Y-direction (i.e., index direction or secondary scanning direction) under computer control. The build platform 20 also is supported for movement and is driven up and down (typically progressively downward during the build process) in the Z-direction under computer control.

Figure 2:
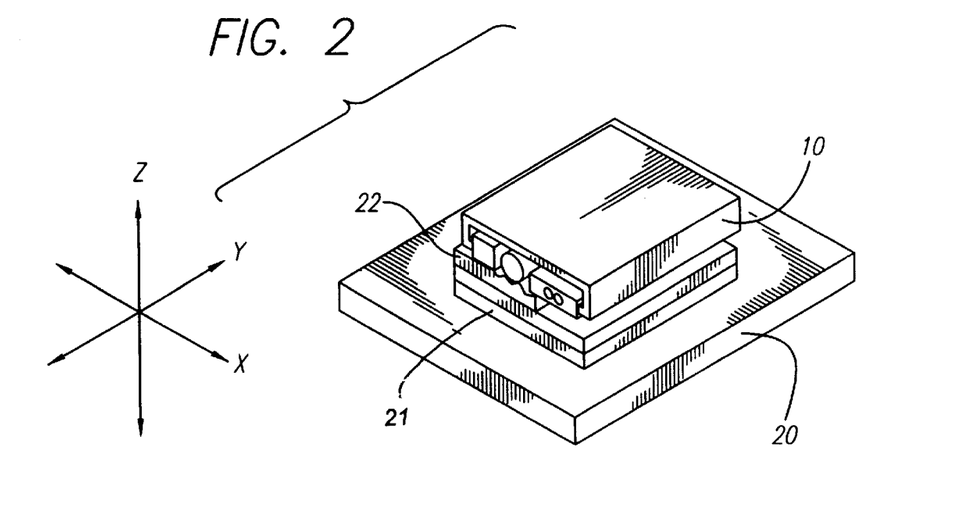
FIG. 2 illustrates a three-dimensional view of a build platform.

FIG. 2 illustrates another view of a build platform 20. A three-dimensional object 21 is being built, layer-by-layer, on the build platform 20. As hot-melt ink is deposited onto the build platform 20, the deposition builds layers of a three-dimensional object. The layers form an object 21 in three-dimensions (X, Y, and Z).

To build a cross-section of a part, the build platform 20 moves in the Z-direction relative to the print head 12, such that the last-built (i.e., dispensed and possibly planed) layer of the part is situated an appropriate amount below the orifice plate 18 of the print head 12. The print head 12 is moved one or more times over the XY build region (the head sweeps back and forth in the X direction, while the Y-stage translates the partially formed object in the Y-direction). The combination of the last formed layer of the object and any supports associated therewith define the working surface for deposition of the next lamina and any supports associated therewith. During translation in the XY directions, the jets of the print head are fired in a registered manner with previously dispensed layers to deposit material in a desired pattern and sequence for the building of the next lamina of the object. During the dispensing process, a portion of the dispensed material is removed by the planarizer in the manner discussed above. The X, Y and Z movements, dispensing, and planarizing are repeated to build up the object from a plurality of selectively dispensed and adhered layers. In an alternative embodiment the step of planarization could be performed independently of the dispensing steps. In other alternative embodiments the planarizer may not be used on all layers but instead may be used on selected or periodic layers.

As noted previously, in a preferred embodiment, the print head is directed to trace a raster pattern. The raster pattern consists of a series of raster lines, R(1), R(2), . . . , R(N), running in the X-direction or main scanning direction and arrayed along the Y-direction (i.e. index direction or secondary scanning direction). The raster lines are spaced from one another by a distance $d_r$, which, in a preferred embodiment, is 1/300 inches (about 3.3 mils or about 83.8 $\mu$m).

This is accomplished by following a two-step process. The first step includes alternating main scanning direction passes with secondary scanning direction movements of an amount equal to the desired raster line resolution until all raster lines between initial lines dispensed by two adjacent jets are scanned. Thereafter, a second step includes a large index direction increment is made. The first and second steps are repeated until the indexing direction increments, and lines scanned, are sufficient to deposit material on all raster lines required to form the object layer or cross-section (including any necessary supports for forming subsequent cross-sections).

The firing of the ink jet orifices is controlled by a rectangular bit map maintained in a control computer or other memory device (not shown). The bit map consists of a grid of memory cells, in which each memory cell corresponds to a pixel of the working surface, and in which the rows of the grid extend in the main scanning direction (X-direction) and the columns of the grid extend in the secondary scanning direction (Y-direction). The width of (or distance between) the rows (spacing along the Y-direction) may be different from the width (or length of or distance between) of the columns (spacing along the X-direction) dictating that different data resolutions may exist along the X and Y directions. In alternative embodiments, non-uniform pixel size is possible within a layer or between layers wherein one or both of the pixel width or length is varied by pixel position. In other alternatives, other pixel alignment patterns are possible. For example, pixels on adjacent rows may be offset in the main scanning direction by a fractional amount of the spacing between pixels in the main scanning direction so that their center points do not align with the center points of the pixels in the neighboring rows. This fractional amount may be ½ so that their center points are aligned with the pixel boundaries of adjacent rows. It may be ⅓ or some other amount such that two or more intermediate rows of pixels are located between rows where pixels are realigned in the main scanning direction. In further alternatives, pixel alignment might be dependent on the geometry of the object or support structure being dispensed. For example, it might be desirable to shift pixel alignment when forming a portion of a support pattern that is supposed to bridge a gap between support columns. These and other alternative pixel alignment schemes can be implemented by modifying the pixel configuration or alternatively defining a higher resolution pixel arrangement (in X and/or Y) and using pixel firing patterns that do not fire on every pixel location but instead fire on selected spaced pixel locations which may vary according to a desired random, predetermined or object basis pattern.

The data resolution in the main scanning direction may be defined in terms of Main Direction Pixels (MDPs). MDPs may be described in terms of pixel length or in terms of number of pixels per unit length. In a preferred embodiment MDP=300 pixels per inch (3.3 mils/pixel or 677.4 $\mu$m/pixel). In other preferred embodiments MDP=1200 pixels per inch. Similarly the data resolution in the secondary scanning direction may be defined in terms of Secondary Direction Pixels (SDPs) and the SDPs may be described in terms of pixel width or in terms of number of pixels per unit length. In a preferred embodiment SDP=MDP=300 pixels per inch (3.3 mils/pixel or 677.4 $\mu$m/pixel). The SDP may or may not be equivalent to spacing between raster lines and the MDP may or may not be equivalent to the spacing between successive drop locations along each raster line. The spacing between successive raster lines may be defined as Secondary Drop Locations (SDLs), while spacing between successive drop locations along each raster line may be defined as Main Drop Locations (MDLs). Similar to SDPs and MDPs, SDLs and MDLs may be defined in terms of drops per unit length or drop spacing.

If SDP=SDL there is a one to one correspondence between data and drop locations along the secondary scanning direction and the pixel spacing is equal to that of the raster line spacing. If MDP=MDL there is a one to one correspondence between data and drop locations along the main scanning direction.

If SDL and/or MDL is larger than SDP and MDP, respectively, more drops will need to be fired than that for which data exists, thus each pixel will need to be used in causing more than one droplet to be dispensed. The dispensing of these extra droplets can be done in one of two ways, either by dispensing the droplets at intermediate points between the centers of successive pixels (i.e. intermediate dropping, "ID") or alternatively directly on top of pixel centers (i.e. direct dropping, "DD"). In either case this technique is called "overprinting" and results in faster build up of material and eases mechanical design constraints involving maximum scan speeds and acceleration rates since the same Z-build up can occur while moving the print head and/or object more slowly.

If SDL and/or MDL is less than SDP and/or MDP, respectfully, drops will be fired at fewer locations than those for which data exists, at least for a given pass of the print head. This data situation may be used to implement the offset pixel and/or non-uniform sized pixel techniques discussed above.

To build a cross-section, the bit map is first loaded with data representative of the desired cross-section (as well as any supports which are desired to be built). Assuming, as with the preferred embodiment, a single build and support material is being used, if it is desired to deposit material at a given pixel location, then the memory cell corresponding to that location is appropriately flagged (e.g. loaded with a binary "1") and if no material is to be deposited an opposite flag is used (e.g. a binary "0"). If multiple materials are used, cells corresponding to deposition sites are flagged appropriately to indicate not only drop location sites but also the material type to be deposited. For ease of data handling, compressed data defining an object or support region (e.g. on-off location points along each raster line) can be booleaned with a fill pattern description to be used for the particular region to derive a final bit map representation used for firing the dispensing jets. The raster lines making up the grid are then assigned to individual orifices in the manner described earlier. Then, a particular orifice is directed to fire or not over a pixel depending on how the corresponding cell in the bit map is flagged.

The first through fifth preferred embodiments of the instant invention involve controlling the temperature of a portion of a three-dimensional object. In particular, the temperature is maintained within a predetermined range. The temperature must be low enough to cause the solidifiable material to solidify or freeze. However, the temperature must be high enough to minimize stresses in the three-dimensional object.

FIG. 1 depicts a representative example apparatus and system for processes according to the first through fifth preferred embodiments of the instant invention. These embodiments use a number of fans (e.g., one to five fans) to cool a surface of the three-dimensional object 21 and portions (layers) 22 of the object during formation of the object. The fans are preferably supported on the dispensing carriage 10. For example, the fans may be located on one end of the carriage, such as the opposite side of the head 12 relative to the roller 14, as shown in FIG. 1 or, alternatively, on the opposite side of the roller 14 relative to the head 12. In yet further embodiments, the fans may be disposed between the planarizer 14 and dispensing head 12. For embodiments employing multiple fans, each fan is preferably separately controlled to be turned on or off independent of the other fans. In further preferred embodiments, the flow rate of each fan can be modified independent of other fans. The capability to individually control each fan allows the system to provide varying rates of air to be applied onto the surface of the three-dimensional object being formed. Hence, the temperature of the portion of the three-dimensional object can be maintained relatively accurately, within a desired range.

In a first embodiment of the instant invention, the temperature of the three-dimensional object being formed is detected. A mechanism for detecting the temperature is preferably located in a chamber 24 that houses the apparatus for performing Selective Deposition Modeling (also referred to as the build environment). The temperature can be detected using, for example, an infra-red sensor or other well known temperature measuring devices. FIG. 1 includes a block diagram representation of a temperature sensor 23 coupled to a suitable processor 25 for controlling the fans 15 and 26 based on the sensed temperature and a suitable processor control program.

Based on the detected temperature of the three-dimensional object being formed, the number of fans and/or the flow rate produced by each fan is variably controlled For example, if the temperature of the three-dimensional object is too hot (e.g., above a preset threshold value defined by the processor program), one or more fans are operated under control of the processor to help cool the three-dimensional object. If the temperature is too low (e.g., below a preset low point), the number of fans operating or the flow rate produced by one or more fans may be reduced under the control of the processor. In further preferred embodiments, the fans may be coupled to receive and blow refrigerated and/or heated air (or other gas) from suitable refrigerated or heated gas sources (not shown) for blowing refrigerated or heated air (or gas) under the control of the processor 25.

In alternative embodiments of the first embodiment of the present invention, the temperature is detected at a plurality of locations on the three-dimensional object. These locations are often referred to as regions. The temperature and quantity of the air is then selectively applied differently to the different regions based on the temperature detected for the different regions. Applying the air in this manner may prevent the three-dimensional object from experiencing different temperatures at different regions, and thus, avoids differential shrinkage.

In a further embodiment, the gas is applied from one side of the dispensing head 12. Some temperature controlling techniques apply the gas from both sides of the dispenser. However, applying the gas from both sides tends to slow down the time it takes the dispensing carriage 10 to move back and forth. The same amount of gas can be applied from one side of the dispensing head.

In another embodiment, the gas can be applied from a location between the dispensing head 12 and the planarizer 14. Applying the gas from this location allows the solidifiable material to be cooled before it is planarized. The planarizer 14 can make the surface of the material that has been cooled smoother than the surface of the material that has not been cooled.

A second preferred embodiment is similar to the first embodiment with the exception that the quantity and temperature of the gas is variably controlled based on the geometry of the three-dimensional object being formed. The geometry of a three-dimensional object affects the insulating properties of the three-dimensional object. Specifically, a particular geometry may produce a three-dimensional object that retains heat better than an object with another geometry. Consequently, the temperature and quantity of the gas required to remove the heat from each object may vary from object to object and from object portion to object portion. The quantity of gas can be variably controlled by modifying the number of fans directing air onto the surface of the three-dimensional surface, by changing the flow rate of the gas being moved by each fan and/or by providing refrigerated or heated gas to the fan inlets. The quantity may also change by turning one or more fans off or on.

In an alternative configuration of the second embodiment, the geometry of the object (and/or layer) being built or about to be built can be detected by software or by any other known device used to detect geometry. Another alternative involves using the geometry of previously dispensed material to define the quantity and temperature of gas applied to currently dispensed material. The geometry of any layer of the object can be determined from the software files (or run-time data) used in the Selective Deposition Modeling process to control the print head deposition to form the object or layer. In some cases, successive layers of material have a similar geometry. Therefore, the geometry of a previous layer can be used to estimate the geometry of a subsequent layer. Thus, the number of fans, the flow rate of the fans and/or the temperature of the gas blown by the fans and applied to the surface of a three-dimensional object can be based on the geometry of the layer to be dispensed or of the layer previously dispensed.

The third preferred embodiment is similar to the first and second embodiments with the exception that the number of operating fans, the flow rate of the fans and/or the temperature of the gas blown by the fans is based on predetermined values. These predetermined values may, for example be based on test runs or simulations of the Selective Deposition Modeling process. During these tests or simulations, the temperature of the three-dimensional object is maintained within a desired range and the appropriate fan and gas parameters required to maintain the desired temperature are recorded and then used by the processor 25 in further build processes for building the same or similar object (or layer geometries).

A fourth embodiment of the instant invention involves forming a three-dimensional object in a build environment and detecting the temperature of the build environment. The build environment preferably comprises a closed chamber that houses the head carriage 10 and build platform 20 for performing Selective Deposition Modeling. A suitable mechanism for detecting the temperature can be located in the build environment.

The temperature can be detected using for example, but not limited to a thermistor, an infra-red sensor or other temperature measuring devices. Accordingly, the number of operating fans, the flow rates provided by the fans and/or the temperature of the gas blown by the fans and applied to the surface of the three-dimensional object is variably controlled based on the detected temperature in the build environment.

A fifth embodiment of the present invention is similar to the fourth embodiment except the quantity of fans, the fan flow rate, and the temperature of the gas applied to the surface of the three-dimensional object is based not only on the build environment temperature, but also on the detected temperature of the three-dimensional object. The three-dimensional object may retain heat because of its insulating properties. Therefore, the temperature of the three-dimensional object may vary at a different rate than the temperature of the build environment. Controlling cooling or heating systems based on the temperature of the three-dimensional object, in addition to the build environment temperatures, may provide more accurate temperature responsive control.

A sixth embodiment of the invention involves increasing the dispensing rate of the dispensing head 12. Specifically, the dispensing rate is modified during the formation of a three-dimensional object based on a detected temperature of the build environment. The dispensing rate may be defined, for example, using minimum layer per second (MLS) technique. The MLS technique incorporates several variables of the build environment, such as the detected temperature of the build environment, the minimum scan length, whether the dispensing carriage 10 pauses at the end of each pass, and whether the dispensing carriage 10 only pauses at the end of selected passes. Based on these variables, the MLS technique directs the dispensing head 12 to shorten the time increments between dispensations or to lengthen the time increments between dispensations. The use of variable dispensing rates can reduce the time it takes to build a three-dimensional object that has a lower than expected solidifying or freezing time.

A seventh embodiment of the present invention involves controlling cooling or heating based on the thickness of a layer and/or a vertical accumulation rate. According to a preferred embodiments, the number of operating fans, the fan flow rates and/or the temperature of gas blown by the fans is controlled, dependent on the thickness of the layer being or to be formed. Thicker layers may require greater cooling rates than thinner layers. Hence, cooling or heating is controlled, in relation to the thickness of the layer.

According to a further configuration, the number of operating fans, the fan flow rate, and/or the gas temperature is controlled dependent on the vertical accumulation rate of the layers. As the number of layers increase, the insulating capability of the combined layers may increase. That is, a large number of combined layers may be capable of retaining more heat than a smaller number of combined layers. Therefore, an increased quantity of gas or a lower gas temperature may be required to remove the heat from a larger number of combined layers. Past experiments show that the a desired quantity of gas can be applied when the accumulation rate is 1.5 mils/15 seconds.

We claim:

1. A method of forming a three-dimensional object, comprising the steps of:

forming the three-dimensional object in layer-by-layer portions using selective deposition modeling, wherein a formed portion of the three-dimensional object has a temperature and a surface;

detecting the temperature of the formed portion of the three-dimensional object; and forcing a gas onto the surface of the formed portion of the three-dimensional object, the forced gas having a characteristic, and wherein the characteristic of the forced gas is variably controlled based on the detected temperature of the formed portion of the three-dimensional object.

2. The method of claim 1, wherein the characteristic is a quantity of the forced gas.

3. The method of claim 1, wherein the characteristic is a temperature of the forced gas.

4. The method of claim 1, wherein the forced gas is a cooling gas.

5. The method of claim 1, wherein the step of forming the portion of the three-dimensional object further comprises forming the portion of the three-dimensional object by using a dispensing head which controllably dispenses a flowable material that solidifies upon being dispensed.

6. The method of claim 5, wherein the dispensing head has at least two sides, and wherein the step of forcing the gas further comprises forcing the gas from a position located at one side of the dispensing head.

7. The method of claim 5, wherein the step of forming a portion of the three-dimensional object further comprises forming a portion of the three-dimensional object by using a planarizer to planerize the solidified material.

8. The method of claim 7, wherein the step of forcing the gas further comprises forcing the gas from a position located in between the dispensing head and the planarizer.

9. The method of claim 7, wherein the step of forcing the gas further comprises forcing the gas after using both the dispensing head and the planarizer.

10. The method of claim 1, wherein the formed portion of the three-dimensional object has at least one region, and wherein the step of detecting the temperature further comprises detecting the temperature at each region of the formed portion of the three-dimensional object.

11. The method of claim 10, wherein the step of forcing the gas further comprises selectively forcing the gas onto each region of the formed portion of the three-dimensional object based on the detected temperature at each region of the formed portion of the three-dimensional object.

12. A method of forming a three-dimensional object, comprising the steps of:

forming the three-dimensional object in layer-by-layer portions using selective deposition modeling, wherein each of the formed portions of the three-dimensional object has a geometry and a surface; and forcing a gas flow in a flow rate onto the surface of each formed portion of the three-dimensional object, the forced gas flow having a characteristic, and wherein the characteristic of the forced gas flow is variably controlled based on the geometry of each formed portion of the three-dimensional object.

13. The method of claim 12, wherein the characteristic is a quantity of the forced gas.

14. The method of claim 13, wherein the step of forcing the gas further comprises forcing the gas flow rate using at least one fan.

15. The method of claim 14, wherein the quantity of gas is variably controlled by changing the flow rate of gas being forced by each fan.

16. The method of claim 14, wherein the quantity of gas is variably controlled by changing a number of fans used to force the gas flow.

17. The method of claim 14, wherein the at least one fan comprises a first fan and a second fan, and wherein the step of forcing the gas flow further comprises forcing the gas using the first fan and the second fan, the first fan producing a nonzero quantity of gas flow and the second fan selectively producing a non-zero or zero quantity of gas flow.

18. The method of claim 12, wherein the characteristic is a temperature of the forced gas.

19. The method of claim 12, wherein the method further comprises the step of detecting the geometry of the formed portion of the three-dimensional object.

20. The method of claim 12, wherein the method further comprises the step of determining the geometry of the formed portion of the three-dimensional object using software.

21. The method of claim 12, wherein the step of forming at least one portion of the three-dimensional object further comprises forming a first portion of the three-dimensional object at a first time and forming a second portion of the three-dimensional object at a second time, wherein the geometry of the second portion is equal to the geometry of the first portion.

22. The method of claim 12, wherein the step of forming at least one portion of the three-dimensional object further comprises the steps of:

forming a portion of the three-dimensional object at a first time; and identifying an unformed portion of the three-dimensional object, wherein the unformed portion will be formed at a second time, and wherein the geometry of the formed portion is equal to the geometry of the unformed portion.

23. A method of forming a three-dimensional object, comprising the steps of:

forming the three-dimensional object in layer-by-layer portions using selective deposition modeling, wherein a formed portion of the three-dimensional object has a surface; and forcing the gas onto the surface of the formed portion of the three-dimensional object, wherein the gas has a quantity and a temperature, and wherein the quantity of gas is variably controlled based on a pre-determined quantity of gas value, and wherein the temperature of the gas is variably controlled based on a pre-determined temperature of gas value.

24. The method of claim 23, wherein the gas is a cooling gas.

25. The method of claim 23, wherein the step of forming the portion of the three-dimensional object further comprises the steps of:

forming the portion of the three-dimensional object by using a dispensing head which controllably dispenses a flowable material that solidifies upon being dispensed, and passing the dispensing head over the formed portion after the flowable material solidifies.

26. The method of claim 25, wherein the step of detecting further comprises detecting the gas temperature before the step of passing the dispensing head over the formed portion.

27. The method of claim 25, wherein the step of detecting further comprises detecting the gas temperature after the step of passing the dispensing head over the formed portion.

28. A method of forming a three-dimensional object, comprising the steps of:

forming the three-dimensional object in layer-by-layer portions using selective deposition modeling, wherein a portion of the three-dimensional object is formed in a build environment that has a temperature;

detecting the temperature of the build environment; and forcing a gas through the build environment, the forced gas having a characteristic, and wherein the characteristic of the forced gas is related to the detected temperature of the build environment.

29. A method of forming a three-dimensional object, comprising the steps of:

forming the three-dimensional object in layer-by-layer portions using selective deposition modeling, wherein the three-dimensional object has a temperature, and wherein the portion of the three-dimensional object is formed in a build environment that has a temperature;

detecting the temperature of the build environment;

detecting the temperature of a formed portion of the three-dimensional object; and forcing a gas through the build environment, the forced gas having a characteristic, and wherein the characteristic of the forced gas is related to the detected temperature of the build environment and the formed portion of the three-dimensional object.

30. A method of forming a three-dimensional object, comprising the steps of:
- forming the three-dimensional object in layer-by-layer portions using selective deposition modeling, wherein selective deposition modeling involves using a dispensing head which controllably dispenses a flowable material that solidifies upon being dispensed, and wherein the dispensing head has a dispensing rate;
- detecting the temperature of a build environment, wherein the build environment houses the formed portion of the three-dimensional object; and
- modifying the dispensing rate using a minimum layer per second (MLS) technique, wherein the MLS technique incorporates the detected temperature of the build environment.

31. A method of forming a three-dimensional object, comprising the steps of:
- forming the three-dimensional object in layer-by-layer portions using selective deposition modeling, wherein selective deposition modeling involves using a dispensing head which controllably dispenses a flowable material that solidifies upon being dispensed, and wherein a formed portion of the three-dimensional object has a surface;
- forcing a quantity of gas onto the surface of the formed portion of the three-dimensional object; and
- selecting a thickness and a vertical accumulation rate of the flowable material, wherein the thickness is based on the forced quantity of gas, and wherein the vertical accumulation rate is greater than 1.5 mils/15 seconds.

32. An apparatus for forming a three-dimensional object, comprising:
- means for forming the three-dimensional object in layer-by-layer portions using selective deposition modeling, wherein a formed portion of the three-dimensional object has a temperature and a surface;
- means for detecting the temperature of the formed portion of the three-dimensional object; and
- means for forcing a gas onto the surface of the formed portion of the three-dimensional object, the forced gas having a characteristic, and wherein the characteristic of the forced gas is variably controlled based on the detected temperature of the formed portion of the three-dimensional object.

33. An apparatus for forming a three-dimensional object, comprising:
- means for forming the three-dimensional object in layer-by-layer portions using selective deposition modeling, wherein each of the formed portions of the three-dimensional object has a geometry and a surface; and
- means for forcing a gas onto the surface of each formed portion of the three-dimensional object, the forced gas having a characteristic, and wherein the characteristic of the forced gas is variably controlled based on the geometry of each formed portion of the three-dimensional object.

34. An apparatus for forming a three-dimensional object, comprising:
- means for forming the three-dimensional object in layer-by-layer portions using selective deposition modeling, wherein a formed portion of the three-dimensional object has a surface; and
- means for forcing the gas onto the surface of the formed portion of the three-dimensional object, wherein the gas has a quantity and a temperature, and wherein the quantity of gas is variably controlled based on a pre-determined quantity of gas value, and wherein the temperature of the gas is variably controlled based on a pre-determined temperature of gas value.

35. An apparatus for forming a three-dimensional object, comprising:
- means for forming the three-dimensional object in layer-by-layer portions using selective deposition modeling, wherein a portion of the three-dimensional object is formed in a build environment that has a temperature;
- means for detecting the temperature of the build environment; and
- means for forcing a gas through the build environment, the forced gas having a characteristic, and wherein the characteristic of the forced gas is related to the detected temperature of the build environment.

36. An apparatus for forming a three-dimensional object, comprising:
- means for forming the three-dimensional object in layer-by-layer portions using selective deposition modeling, wherein the three-dimensional object has a temperature, and wherein a portion of the three-dimensional object is formed in a build environment that has a temperature;
- means for detecting the temperature of the formed portion of the three-dimensional object; and
- means for forcing a gas through the build environment, the forced gas having a characteristic, and wherein the characteristic of the forced gas is related to the detected temperature of the formed portion of the three-dimensional object.

37. An apparatus for forming a three-dimensional object, comprising:
- means for forming the three-dimensional object in layer-by-layer portions using selective deposition modeling, wherein selective deposition modeling involves using a dispensing head which controllably dispenses a flowable material that solidifies upon being dispensed, and wherein the dispensing head has a dispensing rate;
- means for detecting the temperature of a build environment, wherein the build environment houses the formed portion of the three-dimensional object; and
- means for modifying the dispensing rate using a minimum layer per second (MLS) technique, wherein the MLS technique incorporates the detected temperature of the build environment.

38. An apparatus for forming a three-dimensional object, comprising:
- means for forming the three-dimensional object in layer-by-layer portions using selective deposition modeling, wherein selective deposition modeling involves using a dispensing head which controllably dispenses a flowable material that solidifies upon being dispensed, and wherein the formed portion of the three-dimensional object has a surface;
- means for forcing a quantity of gas onto the surface of the formed portion of a three-dimensional object; and
- means for selecting a thickness and a vertical accumulation rate of the flowable material, wherein the thickness is based on the forced quantity of gas, and wherein the vertical accumulation rate is greater than 1.5 mils/15 seconds.

* * * * *

UNITED STATES PATENT AND TRADEMARK OFFICE
CERTIFICATE OF CORRECTION

PATENT NO.   : 6,162,378
DATED        : December 19, 2000
INVENTOR(S)  : Bryan J. L. Bedal, Joe M. Brown, John Stockwell, Andisheh Vahidkhah It is certified that error appears in the above-identified patent and that said Letters Patent is hereby corrected as shown below:

Column 1,
Line 62, "pat." should read -- part --;

Column 16,
Line 22, "object has a" should read -- object in layer-by-layer portions has a --.

Signed and Sealed this

Twenty-third Day of October, 2001

Attest:

NICHOLAS P. GODICI
Attesting Officer
Acting Director of the United States Patent and Trademark Office